No. 737,764. PATENTED SEPT. 1, 1903.
R. S. McLEOD.
MODE OF AND APPARATUS FOR REGULATING THE CHARGE AND DISCHARGE OF STORAGE BATTERIES USED IN CONJUNCTION WITH DYNAMO ELECTRIC MACHINERY, &c.
APPLICATION FILED JAN. 19, 1903.
NO MODEL.
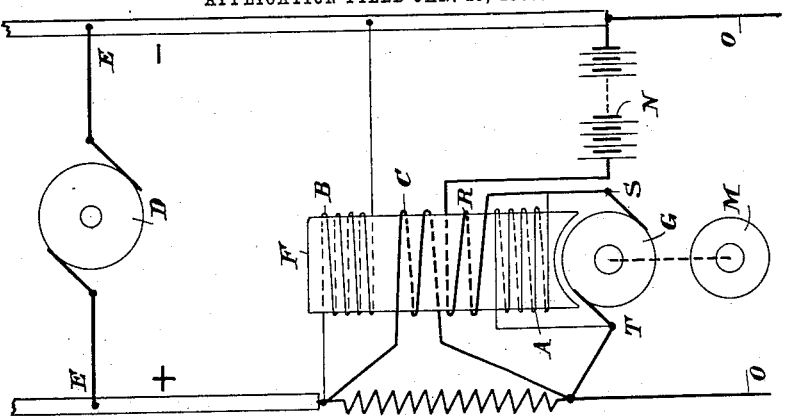
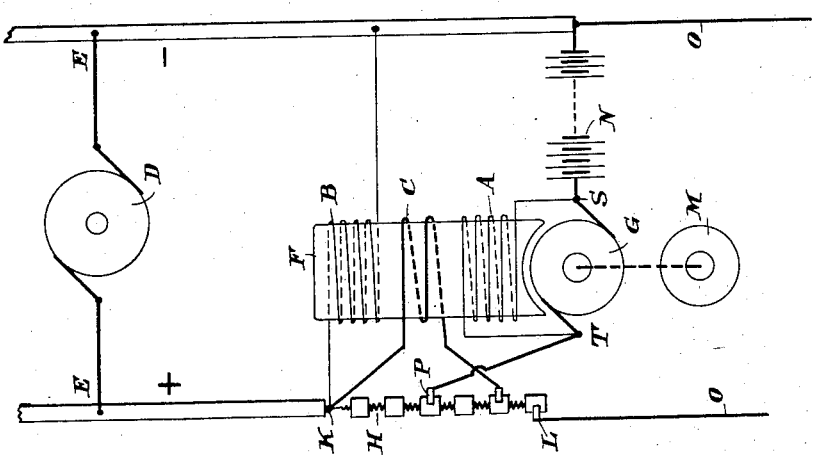
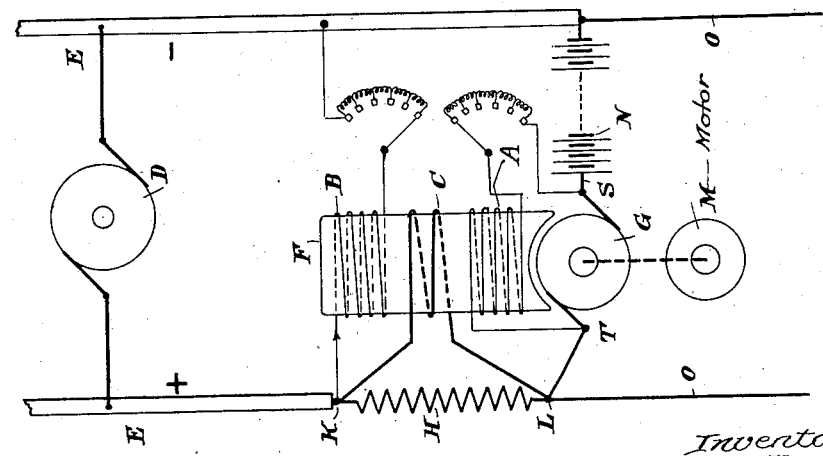

No. 737,764. Patented September 1, 1903.

UNITED STATES PATENT OFFICE.

ROBERT STAFFORD McLEOD, OF MANCHESTER, ENGLAND.

MODE OF AND APPARATUS FOR REGULATING THE CHARGE AND DISCHARGE OF STORAGE BATTERIES USED IN CONJUNCTION WITH DYNAMO-ELECTRIC MACHINERY, &c.

SPECIFICATION forming part of Letters Patent No. 737,764, dated September 1, 1903.

Application filed January 19, 1903. Serial No. 139,666. (No model.)

*To all whom it may concern:*

Be it known that I, ROBERT STAFFORD MC-LEOD, a subject of the King of Great Britain, residing in Manchester, England, have invented certain new and useful improvements in the mode of and in apparatus for regulating the charge and discharge of storage batteries used in conjunction with dynamo-electric machinery for supplying electrical energy, of which the following is a specification.

This invention relates to an improved method of and apparatus for regulating the charge and discharge of storage batteries used in conjunction with dynamo-electric machinery for supplying electrical energy—as, for example, in electric-lighting or electric-traction-generating plants—the object being to so arrange matters that when the power supplied to the external circuits exceeds the normal output of the generating plant or falls below it the balance is respectively supplied by or supplied to the storage battery. I accomplish this by providing a booster driven by any suitable means and having several field-coils so connected to the various parts of the circuits to be regulated that the voltage of the booster changes in magnitude and sign, so as to insure a comparatively uniform output of the generating plant notwithstanding fluctuations in the load.

I have illustrated my invention in the accompanying drawings, in which—

Figures I, II, and III are diagrams representing, respectively, the simplest form of my invention and two modifications thereof.

In each view similar parts are indicated by the same reference-letters.

I have not deemed it necessary to illustrate the construction of the generator, battery, or switchboard, as these may be of any suitable form. Neither have I illustrated the mechanical construction of the booster, which, except for the windings described and the characteristic indicated, may also be of any suitable form.

Assuming in the simplest case that there is a single dynamo generating a continuous current, a storage battery, and a pair of feeders to the external circuits, I connect the booster and its windings, the dynamo, and the battery up as follows:

Referring to Fig. I, D is the main generator, whose terminals are connected to the positive and negative bus-bars E E, to which bus-bars the feeders O O are also connected. G is the armature of the reversible booster, and F is the field-magnet thereof, and M any suitable form of motor adapted to drive the booster at a fairly constant speed, and N is the storage battery.

There are three windings on the booster-field. One winding, which I will term A, is connected across the armature of the booster, and its magnetizing force is such that it provides a magnetic field sufficient to induce in the booster-armature a voltage approximately equal to the difference between the voltage across the mains and the voltage of the battery. A second winding, which I will term B, is connected across the bus-bars, to which the dynamo terminals are connected, and a third winding, which I will term C, is connected to the ends of a diverting resistance H in series with the main current from the dynamo, or C may be in series with the main current. The winding C is so connected that it excites the field in the opposite sense to the winding B, and its magnetizing force is such that with the normal current output it just neutralizes the effect of the winding B.

One terminal of the battery N is connected to, say, the negative bus-bar. The other battery-terminal is connected to one terminal of the booster, and the other terminal of the booster is connected to the feeder at the point L, the feeder end of the resistance H when such resistance is fitted.

If there is no load on the feeders, the battery will be charged, the field being excited in the first instance by the winding B, supplemented by the winding A, so as to add the voltage of the booster to that of the dynamo. The current will increase till it reaches its normal value, when the winding C will neutralize the winding B, and the winding A will provide the necessary exciting power, and as the current in this winding depends upon the difference of voltage between the points S and L—that is to say, the difference between the line and battery voltages—any variation of the battery voltage will be provided for by this winding. When the load comes onto the feeders, the current to the battery will diminish, since there can be no sensible increase in the main current beyond the normal without increasing the magnetizing effect of the winding C, which latter increase has the effect of reducing the booster voltage when this voltage is in opposition to the battery and of increasing it when it is in the same sense as the battery voltage.

It will be seen that the winding A, connected across the armature of the booster, is equivalent to a shunt-winding, and it is so proportioned as to give a somewhat weak field, which field throughout the range of the booster voltage lies on the straight part of the characteristic. It should therefore provide an armature voltage equal always in value and sign to the difference of voltage between the battery and the mains. In practice, however, the arrangement might be somewhat unstable if the winding A alone were provided; but the addition of the windings B and C overcome this objection.

In Fig. II the arrangement is similar to Fig. I, except that a few series turns are interposed in the battery-circuit—say between the battery and the point S. These serve, as in a compound-wound dynamo, to compensate for the drop of volts in the booster-armature, which occurs as the current therein increases.

In Fig. III the compensation last referred to is obtained without the use of additional series turns by connecting the terminal T of the booster to a point P between the ends of the diverting resistance H. By means of this connection it will be seen that variations in the booster-current will independently of the main current vary the amount of current taken by the coil C, since variation of the booster-current will vary the potential difference between the points K and L.

In the foregoing description I have assumed for simplicity that there is but the one main generator. In most cases there would, of course, be a number of generators, and some means for regulating the diverting resistance would be required. I have shown such an arrangement in Fig. III, in which the resistance H is made up in the usual rheostat form and the end of the series winding C and the connection from T are attached to sliding contacts, the position of which on the resistance-contacts can be varied. In this way the proportion of the main current taken by the coil C can be varied. The position of the point P can also be varied between K and L, and thus increase or minimize the amount by which the current in the coil C is varied by the variation of the booster-current to compensate for the lost volts in the booster-armature, thus rendering such compensation more or less sensitive. Resistances are also interposed in the circuits of the coils A and B for the purpose of adjustment.

Having now fully described my invention, what I claim, and desire to secure by Letters Patent, is—

1. In apparatus as herein described, in combination with a main generator and a storage battery, a booster the armature of which is connected in series with the battery across the generator-mains, a motor adapted to drive the booster, a series coil on the booster-field in which the current varies as the main current, a shunt-coil on the booster-field in which the current varies as the main voltage, and a coil on the booster-field in which the current varies as the difference between the main voltage and the battery voltage; substantially as described.

2. In apparatus as herein described, in combination with a main generator and a storage battery, a booster the armature of which is connected in series with the battery across the generator-mains, a motor adapted to drive the booster, a series coil on the booster-field connected to the ends of a diverting resistance in the main circuit, a shunt-coil on the booster-field connected across the main circuit, and a coil on the booster-field connected as a shunt across the booster-armature; substantially as described.

3. In apparatus as herein described, in combination with a main generator and a storage battery, a booster the armature of which is connected in series with the battery across the generator-mains, a motor adapted to drive the booster, a diverting resistance in the main circuit to an intermediate point in which one terminal of the booster-armature is connected, a series coil on the booster-field connected to the ends of the diverting resistance, a shunt-coil on the booster-field connected across the main circuit and a coil on the booster-field connected as a shunt across the booster-armature; substantially as described.

4. In apparatus as herein described, in combination with a main generator and a storage battery, a booster the armature of which is connected in series with the battery across the generator-mains, a motor adapted to drive the booster, a diverting resistance in the main circuit to an intermediate point in which one terminal of the booster-armature is connected, a series coil on the booster-field connected to the ends of the diverting resistance, a shunt-coil on the booster-field connected across the main circuit and a coil on the booster-field connected as a shunt across the booster-armature, the resistance of said coil and the number of turns thereof being adapted to give an excitation of field to provide a voltage equal to that between the ends of the said coil; substantially as described.

5. In apparatus in the class described and in combination, a main generator, a storage battery, a booster, a motor adapted to drive the booster, a diverting resistance in the main circuit, a series coil on the booster-field connected to the ends of the diverting resistance, a shunt-coil on the booster-field connected across the main circuit and a coil on the booster-field connected as a shunt across the booster-armature, the armature of the booster having an adjustable connection with the diverting resistance and being in series with the battery across the generator-mains, substantially as described.

In testimony whereof I have hereunto set my hand in the presence of two subscribing witnesses.

ROBERT STAFFORD McLEOD.

Witnesses:
J. E. LLOYD BARNES,
JOSEPH E. HIRST.